(12) United States Patent
Cooper et al.

(10) Patent No.: US 7,986,724 B2
(45) Date of Patent: Jul. 26, 2011

(54) DIGITAL AUDIO/VIDEO BROADCAST ON CELLULAR SYSTEMS

(75) Inventors: Jeffrey Allen Cooper, Rocky Hill, NJ (US); Kumar Ramaswamy, Plainsboro, NJ (US)

(73) Assignee: Rhomson Licensing, Boulogne-Billancourt (FR)

(*) Notice: Subject to any disclaimer, the term of this patent is extended or adjusted under 35 U.S.C. 154(b) by 1456 days.

(21) Appl. No.: 10/483,688

(22) PCT Filed: Jul. 12, 2002

(86) PCT No.: PCT/US02/22556
§ 371 (c)(1),
(2), (4) Date: Jan. 13, 2004

(87) PCT Pub. No.: WO03/007580
PCT Pub. Date: Jan. 23, 2003

(65) Prior Publication Data
US 2004/0174927 A1 Sep. 9, 2004

Related U.S. Application Data

(60) Provisional application No. 60/305,243, filed on Jul. 13, 2001.

(51) Int. Cl.
*H04B 1/00* (2006.01)
(52) U.S. Cl. ........ 375/142; 455/518; 455/517; 455/522; 455/450

(58) Field of Classification Search .................. 375/142, 375/145, 146, 206, 219; 725/62; 370/342, 370/460, 328, 335, 350; 455/557, 515, 502
See application file for complete search history.

(56) References Cited

U.S. PATENT DOCUMENTS

| | | | | |
|---|---|---|---|---|
| 5,574,975 | A * | 11/1996 | Hill ............................. | 455/503 |
| 5,659,353 | A * | 8/1997 | Kostreski et al. ............. | 348/21 |
| 5,852,612 | A * | 12/1998 | Kostreski et al. ............ | 370/537 |
| 5,956,368 | A * | 9/1999 | Jamal et al. .................. | 375/146 |
| 6,240,555 | B1 * | 5/2001 | Shoff et al. ................... | 725/110 |
| 6,256,509 | B1 * | 7/2001 | Tanaka et al. ................ | 455/515 |
| 6,643,523 | B2 * | 11/2003 | Goetz .......................... | 455/557 |
| 6,684,079 | B1 | 1/2004 | Aretz et al. | |
| 6,714,585 | B1 * | 3/2004 | Wang et al. .................. | 375/148 |
| 2001/0033611 | A1 * | 10/2001 | Grimwood et al. .......... | 375/219 |

FOREIGN PATENT DOCUMENTS

DE 198 45 040 A1 4/2000
JP 2000-175263 6/2000

* cited by examiner

*Primary Examiner* — Mohammad Ghayour
*Assistant Examiner* — Sonia J King
(74) *Attorney, Agent, or Firm* — Robert D. Shedd; Robert B. Levy; Jeffrey D. Hale

(57) ABSTRACT

A method for providing information to a plurality of wireless mobile communication devices. The method includes dedicating at least one channel of a plurality of spread spectrum data channels as a broadcast channel. The frequency and phase of a carrier signal and of a chip rate clock of the at least one channel are synchronized for each of a plurality of cell transmitters of a respective plurality of base stations. The Information is then broadcast over the at least one dedicated channel from each base station.

20 Claims, 4 Drawing Sheets

DIGITAL AUDIO/VIDEO BROADCAST ON CELLULAR SYSTEMS

CROSS-REFERENCE TO RELATED APPLICATIONS

This application claims the benefit of under 35 U.S.C. §365 of International Application number PCT/US02/22556, filed Jul. 12, 2002, which claims the benefit of U.S. provisional patent application Ser. No. 60/305,243, filed Jul. 13, 2001.

FIELD OF THE INVENTION

The present invention relates to cellular communication systems. More specifically, the present invention relates to providing audio/video information over cellular communication systems.

BACKGROUND OF THE INVENTION

First generation (1G) wireless communications began in the late 1970's and featured early cellular mobile radio telephone systems using analog voice signaling. Second generation (2G) wireless communications began in the early 1990's and featured digital voice encoding, such as Global System for Mobile (GSM) service and Code Division Multiple Access (CDMA).

Advances in the state of wireless technology and capability from second generation to the current 2.5G wireless communications are associated with General Packet Radio Services (GPRS). The 1G, 2G, and 2.5G wireless communications lack the bandwidth to provide digital multimedia information, such as video information. In particular, present data capabilities have very low bit rates (e.g., 10 kilobits per second) allocated to each user. With such a low bit rate, streaming multimedia information (i.e., audio and video) is not realistic. For example, MP3 requires at least 64 kilobits per second, while video requires at least a few hundred kilobits per second.

UMTS (Universal Mobile Telecommunications Service) (i.e., "third-generation (3G)),") provides broadband, packet-based transmission of text, digitized voice, video, and multimedia at data rates up to 2 megabits per second (Mbps), and offers a consistent set of services to mobile computer and phone users no matter where they are located in the world. However, a problem arises in that only a single user within a cell of a tower may receive the information at the 2 megabits per second rate.

Furthermore, when the user is moving away from the tower, reception of the signal may fade. In order to compensate for the fading effects, the technology is designed to increase reception of the signal. Increasing signal reception is typically achieved by reducing the data rate to the mobile device, such that as the user gets further away from the cell tower, the data rate incrementally decreases from 2 megabits per second, down to, illustratively, 64 kilobits per second or 32 kilobits per second, depending on the distance from the tower. As such, the current system does not support multimedia information being sent contemporaneously to multiple users.

A problem associated with cellular systems is that of interference from adjacent cells. The interference problem exists for all 3G cellular systems that use code division multiplexing to separate users within a cell. If a user is between two adjacent towers, (i.e., the fringe area) the mobile device has to tune to one of the channels, while tuning out (i.e., filtering) the other channel. Typically, interference arises from adjacent channels at the fringe areas between adjacent towers, because the cell towers transmit at various power levels. That is, the closer the user is to the tower, the less power is required, while the further away from a tower (e.g., the fringe area) the more power is required. Consequently, the bit rate achievable at the fringe and is lower than the middle of the cell, which creates inconsistent services for the users.

As such, there is a need to provide multimedia services to multiple users of mobile cellular devices. Furthermore, there is a need to provide consistent multimedia services to such users regardless of the user's location within a cell.

SUMMARY OF THE INVENTION

The present invention is a method for providing information to a plurality of wireless mobile communication devices. The method includes dedicating at least one channel of a plurality of spread spectrum data channels as a broadcast channel. The frequency and phase of a carrier signal and of a chip rate clock of the at least one channel are synchronized for each of a plurality of cell transmitters of a respective plurality of base stations. Multimedia information is then broadcast over the at least one dedicated channel from each base station.

BRIEF DESCRIPTION OF THE DRAWINGS

So that the manner in which the above recited features of the present invention are attained and can be understood in detail, a more particular description of the invention, briefly summarized above, may be had by reference to the embodiments thereof, which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

The present invention is a method of providing information, such as broadcast multimedia information, to each of a plurality of cellular communications devices. The method includes allocating a portion of the cellular communications frequency spectrum for broadcasting such information, such as packetized audio and video information.

Figure 1:
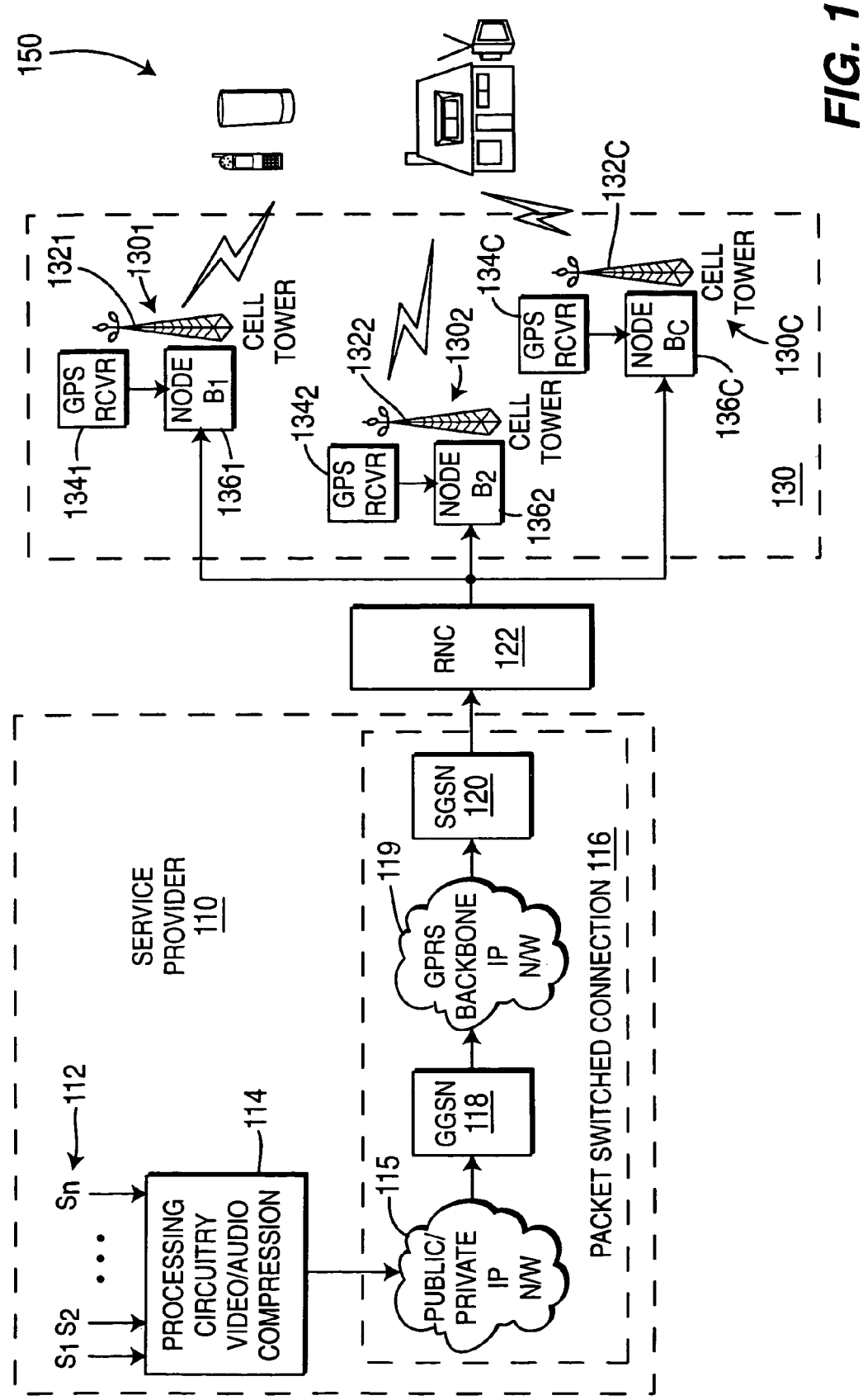
FIG. 1 is a high-level block diagram of a cellular communications system of the present invention.

FIG. 1 is a high-level block diagram of a cellular communications system 100 of the present invention. The cellular communications system 100 comprises a cellular communications service provider 110, a plurality of cells defined by respective cell towers 130, and a plurality of cellular communication devices (i.e., mobile stations (MS) 150). In particular, the service provider 110 comprises a plurality of data sources 112 (shown as sources S1 through SN), processing circuitry comprising audio/video (A/V) compression circuitry 114, a packet switched connection 116, and a radio network controller (RNC) 118.

The packet switched connection 116 comprises a gateway GPRS support node (GGSN) 118 coupled to a serving GPRS support node (SGSN) 120 via a GPRS backbone IP network 119. Furthermore, in one embodiment, the packet switched connection 116 may also include a public or private IP network 115 located between the compressed and multiplexed data sources at the service provider processing circuitry 114 and the GGSN 118.

The service provider 110 is capable of providing a plurality of multimedia information to the mobile stations 150. In particular, the processing and audio/video (A/V) compression circuitry 114 receives audio and/or video information from a plurality of sources (e.g., sources 1 through source n) 112, and generally packetizes and compresses the A/V information into packets, such as MPEG packets, for further routing to the mobile stations 150. It is noted that the packetized information may be stored on storage devices (not shown) at the service provider 110 for future distribution by a stream server (not shown).

Alternatively, the A/V information is packetized and compressed "on-the-fly" after the service provider 110 receives a request for multimedia information. Although the invention is discussed in terms of broadcasting multimedia information, the invention may also be utilized to broadcast any other type of information that is deemed appropriate to a number of users of the mobile stations 150.

The packet-switched connection 116 is a network through which packets of information are routed based on a destination address contained within each packet. Breaking communication information down into packets allows access to the same data path to be shared among many users in the network by various multiplex access techniques (e.g., CDMA, Time Division Multiple Access (TDMA), Frequency Division Multiple Access (FDMA)). This type of communication between sender and receiver is known as connectionless (rather than dedicated). Most traffic over the Internet uses packet switching, such that the Internet is essentially a connectionless network.

The packet-switched connection 116 is provided via the gateway GPRS support node (GGSN) network nodes 118 and the serving GPRS support node (SGSN) 120, which make up the core network elements. The GGSN 118 is connected with the SGSN 120, illustratively, via an IP based GPRS backbone network (not shown). The SGSN 120 is responsible for the delivery of data from and to the mobile stations 150 within the mobile stations' geographical service area. In particular, the SGSN 120 provides packet transfer and routing, mobility management, logical link management, authentication, and accounting functions. The SGSN 120 is at the same hierarchical level as a mobile services switching center (MSC), which is located in the circuit switched network. The packet-switched connection 116 sends the packetized information to the radio network controller (RNC) 122 for further routing to one or more of the plurality of cells 130.

Each cell (e.g., cells $130_1$ through $130_c$ (where "c" is an integer greater than 1)) of the plurality of cells 130 comprises a cell tower 132 (e.g., cell tower $132_1$ through $132_c$) associated with a base station commonly known as Node-B (e.g., Node-$B_1$ $136_1$ through Node-$B_c$ $136_c$). Each Node-B has transmitting and receiving equipment (as discussed below with regard to FIG. 2). Additionally, each cell 130 comprises a GPS receiver (e.g., GPS receiver $134_1$ through $134_c$), which communicates with the Node-B 134.

The RNC 122 is responsible for control of the radio resources in its domain, which includes all of the Node-B's 136 coupled to the RNC 122. The RNC 122 also serves as a service access point for all services (e.g., connection management, among others) that are provided to the core network. In particular, information intended for a specific mobile station 150 is routed by the RNC 122 to a specific Node-B 136, where the packetized information is modulated and transmitted via the towers 132 to the specific mobile station 150.

Figure 2:
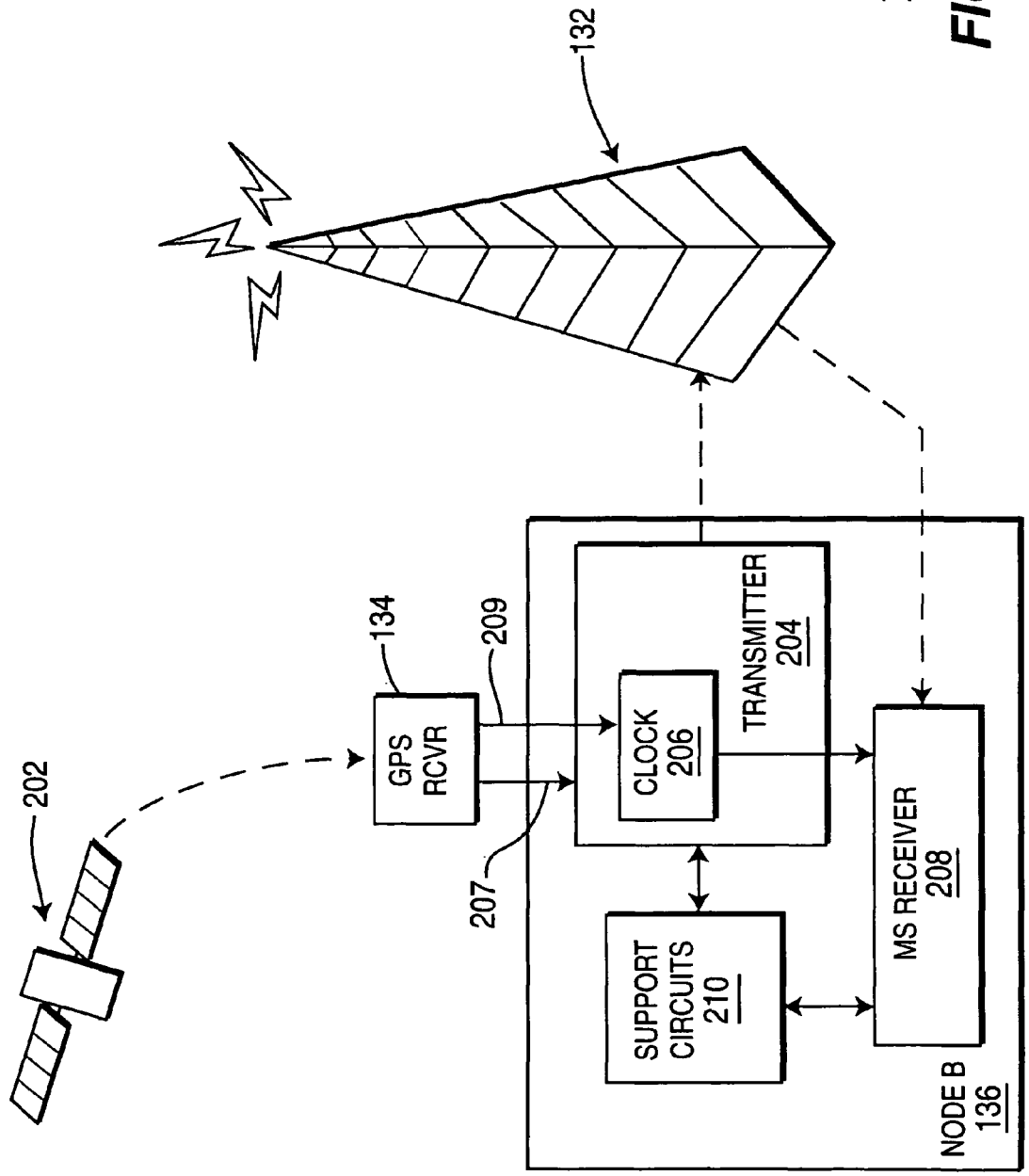
FIG. 2 depicts a high-level block diagram of an exemplary cell of the cellular communications system of FIG. 1.

FIG. 2 depicts a high-level block diagram of an exemplary cell 130 of the cellular communications system 100 of FIG. 1. In particular, the exemplary cell 130 comprises the Node-B 136 and cell tower 132, which are illustratively in communication with the global positioning system (GPS) 202. The Node-B 136 comprises a transmitter 204 having a clock 206, a mobile station receiver 208, and support circuitry (e.g., power supplies, and other support circuitry). In one embodiment, the GPS receiver 134 receives temporal information from the GPS 202, which is utilized by the clock 206 of the transmitter 204, as discussed in further detail below. The transmitter 204 and receiver 208 respectively transmit and receive information between the service provider 110 and the mobile stations 150 via the cellular tower 132.

The plurality of cellular communication devices 150 comprises any communication device capable of transmitting and receiving cellular communications. As will be discussed in detail below, the plurality of cellular communication devices 150 may be mobile cellular equipment having a subscriber identity module (SIM), such as a cell phone, PDA, and the like. Alternately, the plurality of cellular communication devices 150 may also include and/or operate in conjunction with, for example, laptop computers or non-mobile devices, such as desktop computers and television sets that are capable of receiving packetized information.

Figure 3:
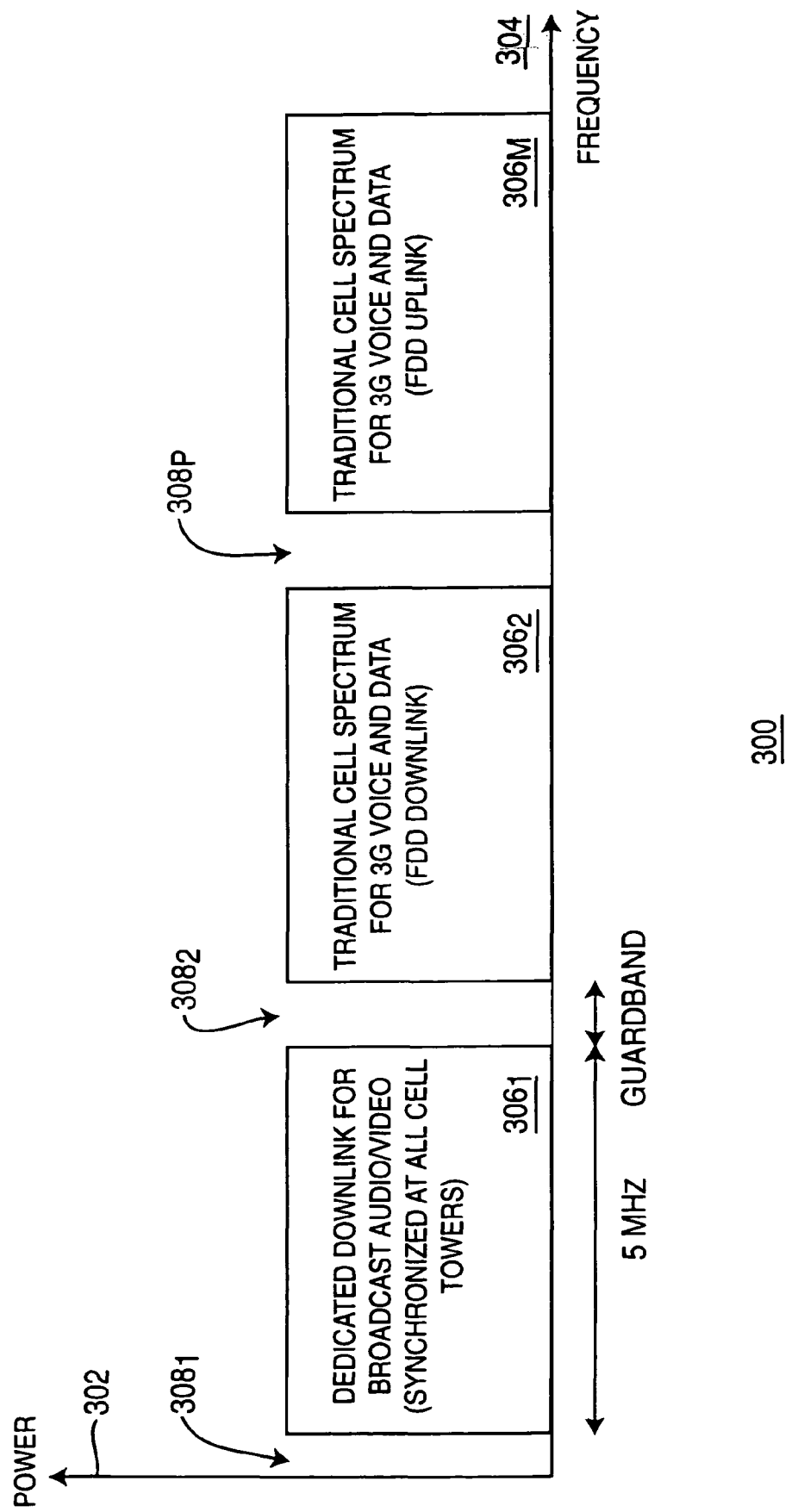
FIG. 3 is a graphical view representing spectrum allocation for third generation cellular communications systems of the present invention.

FIG. 3 is a graphical view representing spectrum allocation 300 for third generation cellular communications systems 100 of the present invention. The graph has an ordinate 302 representing increasing power (e.g., Watts), and an abscissa 304 representing increasing frequency (e.g., MHz). FIG. 3 depicts a plurality of 5 MHz channels $306_1$ through $306_m$ (collectively channels 306) distributed across the frequency domain 304, where a plurality of guard bands $308_1$ through $308_p$ (guard bands 308) respectfully separate the individual channels 306.

The 3G cellular communication systems utilize spread spectrum technologies, wherein the spectrum for all uplink transmissions towards the Node-B 136 from all of the mobile stations 150 is shared. The signals from each mobile station 150 are resolved at the Node-B 136 by the unique spread code that is allocated to each mobile station 150. As such, FIG. 3 represents a snapshot in time of a plurality of channels 306, where one band of frequencies (e.g., channel $306_2$) is being used as a frequency division duplex (FDD) downlink channel, while a second band of frequencies (e.g., channel $306_3$) is used as the FDD uplink channel for voice and data signals.

For example, a cellular service provider (e.g., Verizon Inc.) may use five or more different frequency bands (channels) to support the users within the cell. The number of channels utilized is dependent on the number of users within a cell 130 that the service provider 110 must support. When a particular user makes a wireless phone call, the Node-B 136 assigns a unique spread code in the uplink and downlink bands for the mobile station 150 to establish bi-directional communications.

One aspect of the invention is to provide a dedicated channel as a downlink for broadcasted A/V packets of information. FIG. 3 illustratively depicts the first channel $306_1$ as being dedicated for broadcast information. In particular, the broadcast A/V information is provided by the service provider 110 to all of the cells 130 in a synchronized format. That is, all the cell towers 132 broadcast the same information within the dedicated band of frequencies (e.g., channel 306₁) contemporaneously to all of the users.

In particular, the frequency and phase of the carrier signals and chip rate clocks across the wireless system need to be synchronized across all of the cell towers 132. Specifically, each GPS receiver 134 receives temporal information from the commonly used GPS system 202. The GPS receiver 134 provides a carrier reference signal 207 and a clock reference signal 209 to the transmitter 204 of each Node-B 136.

A particular mobile station 150 may receive broadcast signals from two separate cell towers 132, which are synchronized using a GPS reference, and generates a composite signal, as discussed in further detail below with regard to FIG. 3. Given the frequency of operation of the cellular systems 100 and the accuracy of the GPS system 202 and GPS receivers 134, it is possible to limit the reference error to within a few degrees at a mobile station 150. Thus, any user in any cell 130 can tune to their mobile station 150 to the dedicated channel (e.g., channel 306₁) and receive broadcasted information.

It is noted that the frequencies in the dedicated channel (e.g., channel 306₁) are no longer included as available channels used for spread spectrum technology to provide voice and other data to the mobile stations. Furthermore, information broadcast over the dedicated A/V channel 306₁ is transmitted synchronously by all of the cellular base stations 136 and towers 132 of the cells 130. By contrast, under normal operation, the plurality of voice and data channels (e.g., 306₂ and 306₃) is transmitted asynchronously between cell towers 132.

Figure 4:
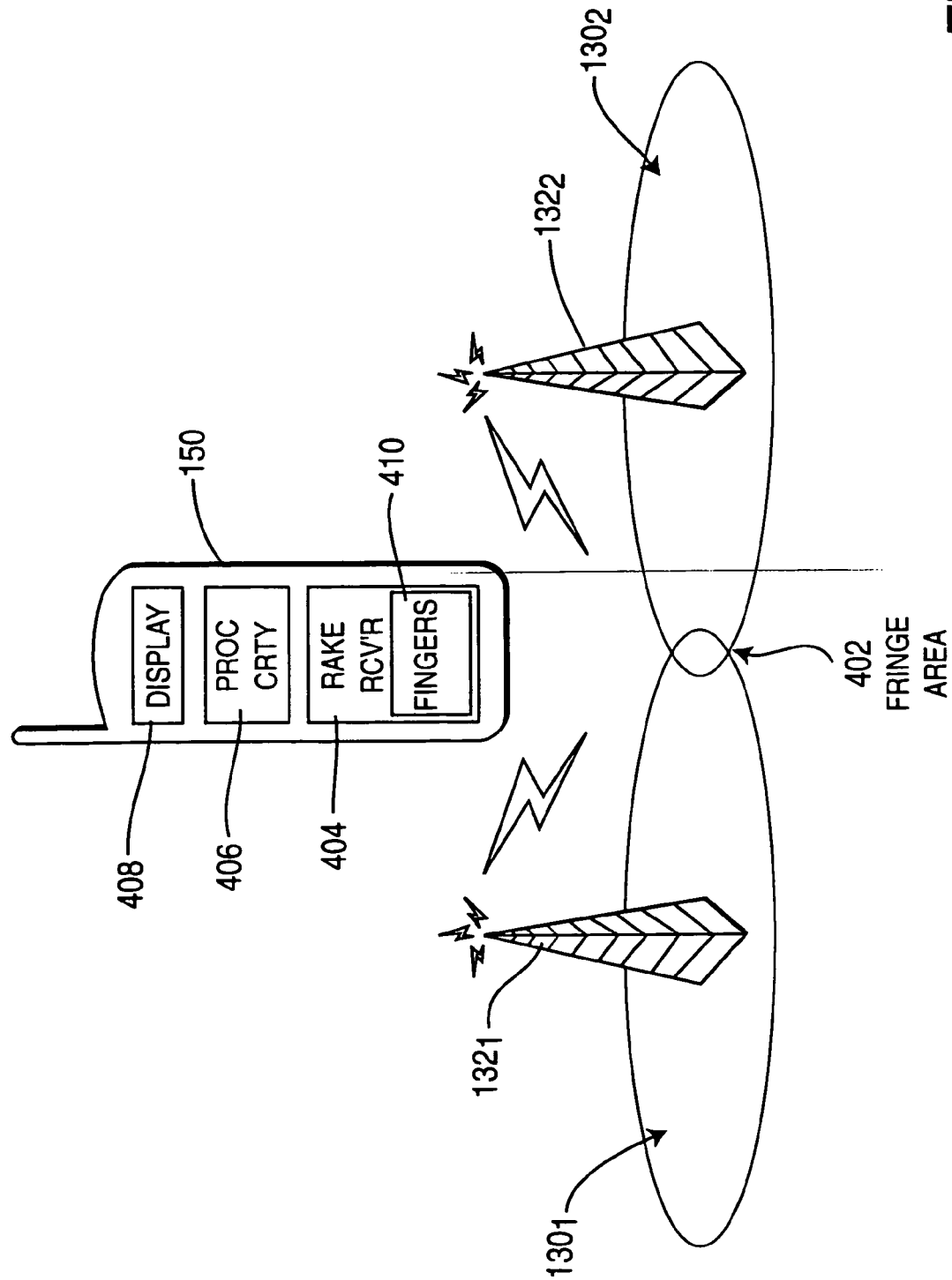
FIG. 4 is a perspective view of a mobile station positioned between two adjacent cells of the cellular communications system of FIG. 1.

FIG. 4 depicts a perspective view of two adjacent cells 130 of the cellular communications system 100 of FIG. 1. In particular, two exemplary adjacent cells 130₁ and 130₂ including their respective cell towers 132₁ and 132₂ are shown. A fringe area 402 is defined near the edge of each cell 130. The fringe area 402 includes overlap between the adjacent cells 130₁ and 130₂. The size of each cell (i.e., coverage area) 130 is dependent on various factors, such as the terrain of the land (e.g., mountainous, large buildings, and the like), as well as the power output from the base station node 136 and height of the cell tower 132.

The power output from the base station nodes 136 and cell towers 132 varies, depending on the distance between the mobile station 150 and the cell tower 132. The closer the mobile station 150 is to the tower 132, the less power is required to receive a signal. Conversely, the further the mobile station 150 is from the tower 132, the greater the strength of the signal. In one embodiment, the signal strength to a given mobile station 150 is controlled at the base station 136 by inserting, at designated intervals, particular packets that serve as "beacons" for the mobile station 150. A mobile station 150 receives the beacon packets and utilizes them to determine the quality of the reception of the signal transmitted from the cell tower 132 at the mobile station 150. The mobile station 150 then provides feedback to base station 136 to enable the base station to adjust the power of the signal, based on, for example, the quality of the received signal at the mobile station 150 that was transmitted by the cell tower 132.

Referring to FIG. 4, a mobile station 150 is shown near the fringe area 320 between two adjacent cells 130₁ and 130₂. The mobile station 150 comprises a rake receiver 404, processing circuitry 406, and one or more audio/video interfaces 408, such as a display and speaker (not shown).

The rake receiver 404 is used to increase signal reception at the mobile station 150. In particular, the rake receiver 404 has a plurality of fingers 410, which are capable of receiving the traditional multipath reflections from the transmitted signal from a tower 132. Each finger 410 comprises a distinct correlator and delay equalizer (not shown), which (recover a unique signal for each multipath component. The rake receiver 404 sums the multipath components together to form a composite signal having both the in-phase (I) and quadrature (Q) components. The composite signal is then sent to the processing circuitry 406 for depacketizing the packets and generally processing (converting) the information into baseband information for distribution to the A/V interface 408 (e.g., display and speaker).

Recall, that the Node-B's 136 and cell towers 132 transmit signals (e.g., voice signals) over the downlink and uplink channels 306₂ and 306₃ asynchronously. When the mobile station 150 is located at the fringe area 402 and communicating via the voice channels (i.e., downlink and uplink channels 306₂ and 306₃ of FIG. 3), the mobile station 150 must filter incoming signals from one of the cell towers 132. In particular, the weaker (interfering) signal must be blocked, while the fingers 410 of the rake receiver 404 receive the multipath components of the stronger signal.

When the signal sent by the cell towers 132 is the broadcasted A/V information over the dedicated channel (e.g., channel 306₁ of FIG. 3), the broadcast signal is synchronously transmitted from all the cell towers 132 with the assistance of, for example, the GPS system 202. Additionally, the signal from each of the dedicated channels (e.g., channel 306₁ of FIG. 3) is identical in all the cell towers 132. In this instance, the rake receiver 404 is used to form a composite signal from any of the signals received from the cellular towers 132.

Referring to FIG. 4, the fingers 410 of the rake receiver 404 receive the signals and reflections from both adjacent cells 130. Each finger 410 utilizes a correlator and delay equalizer to recover the multipath signals from the adjacent cells. Since both illustrative cells broadcast the A/V packetized information contemporaneously, any signal delays are merely caused by reflections of the originating signals, as well as the difference in distances as between the mobile station 150 and each cell tower 132.

For example, the mobile station 150 may be 5 miles from cell tower A 132₁ and 6 miles from cell tower B 132₂. Under similar terrain conditions, the broadcast signal originating at cell tower B 132₂ will reach the mobile station 150 slightly after the broadcast signal originating at cell tower A 132₁. Furthermore, the strength of the broadcast signal originating at cell tower B 132₂ may be less than the broadcast signal originating at cell tower A 132₁, or visa versa, due to the difference in distance, as well as differences in terrain. As such, the rake receiver 404 uses the both the higher power signal from the exemplary cell tower A 132₁, as well as the weaker power signal from the exemplary cell tower B 132₂, to increase the overall gain at the mobile station 150.

It is further noted that the cell towers 132 broadcast the illustrative A/V information via the dedicated channel 306₁ without having to vary the power output, in contrast to the non-synchronized downlink and uplink channels 306₂ and 306₃. Moreover, the power control and interference issues between neighboring cells is without consequence with regard to the signals broadcast over the dedicated channel 306₁. Accordingly, a wider coverage area is achieved for a given cell tower 132 and the fringe area 402 between cells 130.

The inventive feature of a service provider 110 providing a dedicated channel 306 for broadcasting multimedia information produces additional advantages. For example, real time interactivity with the broadcast multimedia information becomes possible with use of the mobile station 150. In particular, the mobile station 150 may receive the broadcast multimedia information over the dedicated channel 306 via one or more cell towers 132, as well as access the data channels of the traditional cellular network through the FDD uplink path (e.g., uplink channel $306_3$).

In this way, the user may respond to questions, advertising, make selections, and the like on the broadcast A/V service. The inventive A/V broadcast system of the cellular communications system 100 does not require any additional hardware to the present mobile stations 150. Furthermore, the interactive types of services essentially have low start up costs, since the subscribers to the service provider automatically have the ability to interact with the A/V content. The A/V services may be multiplexed into one stream to the Node-B stations 136, and then transmitted from the cell towers 132, such that the broadcasted content is transmitted at a rate of 2 Mbps. In one embodiment, approximately 16 television channels may be broadcast at a rate of 128 Kbps/channel.

While foregoing is directed to one embodiment of the present invention, other and further embodiments of the invention may be devised without departing from the basic scope thereof, and the scope thereof is determined by the claims that follow.

What is claimed is:

1. A method, comprising:
   dedicating at least one channel of a plurality of spread spectrum data channels as a broadcast multimedia channel for broadcasting packetized multimedia audio and video information, wherein the frequencies in said dedicated multimedia channel are no longer included as available channels to provide voice and data;
   synchronizing frequency and phase of a carrier signal and of a chip rate clock of the at least one dedicated multimedia channel for each of a plurality of cell transmitters of a respective plurality of base stations; and
   broadcasting multimedia information over said at least one dedicated multimedia channel synchronously from all of said plurality of base stations.

2. The method of claim 1, wherein the information is broadcast on said dedicated channel at the same power level across all of said plurality of cell transmitters.

3. The method of claim 1 further comprising:
   receiving a plurality of broadcast signals at a mobile station;
   correlating and summing said plurality of broadcast signals into a composite signal; and
   processing said composite broadcast signal into a format for human interface.

4. The method of claim 3, wherein said plurality of broadcast signals comprises information from at least two of said plurality of base stations.

5. The method of claim 4, wherein said receive step further comprises receiving broadcast signals from adjacent base stations.

6. The method of claim 5, wherein said correlating and summing step further comprises receiving broadcast signals from adjacent base stations.

7. The method of claim 4, further comprising providing a plurality of audio and video channels via said dedicated broadcast channel.

8. The method of claim 7, wherein said providing a plurality of audio and video channels step comprises:
   multiplexing said channels into a single packetized stream; and
   transmitting said packetized stream from each base station.

9. The method of claim 1, further comprising providing interactive services by a service provider via non-broadcast dedicated channels of said plurality of spread spectrum data channels.

10. The method of claim 9, further comprising enabling users of such interactive services via separate uplink channels.

11. A computer readable medium in a general purpose computer system that operates as a special purpose controller when executing at least one program for broadcasting wireless information, the program being configured to perform the steps of:
    dedicating at least one channel of a plurality of spread spectrum data channels as a broadcast multimedia channel for broadcasting packetized multimedia audio and video information wherein the frequencies in said dedicated multimedia channel are no longer included as available channels to provide voice and data;
    synchronizing frequency and phase of a carrier signal and of a chip rate clock of the at least one dedicated multimedia channel for each of a plurality of cell transmitters of a respective plurality of base stations;
    broadcasting multimedia information over said at least one dedicated multimedia channel synchronously from all of said plurality of base stations.

12. The computer readable medium of claim 11, wherein the information is broadcast on said dedicated channel at the same power level across all of said plurality of cell transmitters.

13. The computer readable medium of claim 11, further comprising:
    receiving a plurality of broadcast signals at a mobile station;
    correlating and summing said plurality of broadcast signals into a composite signal; and
    processing said composite broadcast signal into a format for human interface.

14. The computer readable medium of claim 13, wherein said plurality of broadcast signals comprises information from at least two of said plurality of base stations.

15. The computer readable medium of claim 14, wherein said receiving step further comprises receiving broadcast signals from adjacent base stations.

16. The computer readable medium of claim 15, wherein said correlating and summing step further comprises receiving broadcast signals from adjacent base stations.

17. The computer readable medium of claim 14, further comprising providing a plurality of audio and video channels via said dedicated broadcast channel.

18. The computer readable medium of claim 17, wherein said providing a plurality of audio and video channels step comprises:
    multiplexing said channels into a single packetized stream; and
    transmitting said packetized stream from each base station.

19. The computer readable medium of claim 11 further comprising providing interactive services by a service provider via nonbroadcast dedicated channels of said plurality of spread spectrum data channels.

20. The computer readable medium of claim 19, further comprising enabling users of such interactive services via separate uplink channels.

* * * * *